May 2, 1967 ROBERT T. CHIEN ETAL 3,317,899
INFORMATION PROCESSING SYSTEM UTILIZING A KEY TO ADDRESS TRANSFORMATION CIRCUIT
Filed Oct. 23, 1963 2 Sheets-Sheet 1

INVENTORS
ROBERT T. CHIEN
CHARLES V. FREIMAN
BY Bernard N. Wiener
ATTORNEY

May 2, 1967 ROBERT T. CHIEN ETAL 3,317,899

INFORMATION PROCESSING SYSTEM UTILIZING A KEY TO ADDRESS TRANSFORMATION CIRCUIT

Filed Oct. 23, 1963 2 Sheets-Sheet 2

United States Patent Office 3,317,899

Patented May 2, 1967

3,317,899

INFORMATION PROCESSING SYSTEM UTILIZING A KEY TO ADDRESS TRANSFORMATION CIRCUIT

Robert T. Chien, Yorktown Heights, and Charles V. Freiman, Pleasantville, N.Y., assignors to International Business Machines Corporation, New York, N.Y., a corporation of New York Filed Oct. 23, 1963, Ser. No. 318,232

29 Claims. (Cl. 340—172.5)

This invention relates to an information processing system utilizing a key-addressed file memory. It relates more particularly to use therefor of a key to address circuit wherein keys of arbitrary length are transformed to addresses having a common length.

Generally, information processing systems handle and store information items. These items may consist of microfilmed or other permanent records as well as data stored, for example, in magnetic tape or core memories. In many practical circumstances an information item has both data and identifying key. Illustratively, in a business organization, the data may be a personnel record and the key may be the name of the person or a personnel number. If there are several names or personnel numbers which differ slightly, they are said to be clustered.

In order that data be handled readily in a file system and be stored appropriately in the file memory thereof, it is necessary that the associated key ultimately be assigned to a unique location in the file memory. For a key set which has a cluster property with respect to several keys thereof, it is desirable that the key to address transformation circuit initially assign different addresses for keys in any cluster as defined by some cluster parameter. Heretofore, a key to address transformation circuit which dispersed the keys of a cluster to different addresses has required that the keys have a fixed length no greater than some maximum length related to the cluster parameter. Although a key set is generally considered to contain keys of but one length, it is often true that this uniformity of length is artificially achieved by padding out short keys to some fixed length. Previous key to address transformation circuits have not utilized the presence of the short keys to improve performance. The prior art techniques which appear most closely related to the practice of this invention involve the application of group codes and polynomial codes as defined in the theory of error-correcting codes. The practice thereof has required somewhat complicated circuit structures.

It is an object of this invention to provide a file system with a key to address transformation circuit which transforms keys of unrestricted length to addresses of a common length whether the basic key set contains keys of fixed length or variable length.

It is another object of this invention to provide an information processing system with a key to address transformation circuit which provides different addresses for keys which only differ in positions within a span of $m$ positions where $m$ is an address parameter of a file memory.

It is another object of this invention to provide an information processing system with a key to address transformation circuit which provides different addresses for keys of unrestricted length which only differ in positions within a span of $m$ positions.

It is another object of this invention to provide an information processing system with a key to address transformation circuit which utilizes a circuit having one modulo-2 adder circuit and a delay line.

It is another object of this invention to provide an information processing system with a key to address transformation circuit where the circuit has a delay line and a device for providing algebraic-ring-with-unit-element addition in accordance with the nature of the characterization of the keys.

It is another object of this invention to provide a key to address transformation circuit for keys of fixed but unrestricted length which will assign different addresses to keys within an $m$-span cluster by treating each key as a polynomial and dividing it by a polynomial of the form $AX^m+C_{m-1}X^{m-1}+ \ldots +C_1X^1+B$ where the C's are elements of an algebraic ring with unit element, B is any element of that ring other than the additive identity and A is any element in that ring for which there is a multiplicative inverse.

It is another object of this invention to provide a key to address transformation circuit for keys of fixed but unrestricted length which will assign different addresses to keys within an $m$-space cluster by treating each key as a polynomial and dividing it by a polynomial of the form $1X^m+C_{m-1}X^{m-1}+ \ldots +C_1X^1+1$ where the C's are elements of an algebraic ring with unit element 1.

It is another object of this invention to provide a key to address transformation circuit for keys of variable length which will assign different addresses to keys within an $m$-span cluster by treating each key as a polynomial and dividing it by a polynomial of the form $AX^m+A$ where A is any element of the algebraic ring with unit element for which there is a multiplicative inverse related to the characterization of the keys.

It is another object of this invention to provide a key to address transformation circuit for keys of variable length which will assign different addresses to keys within an $m$-span cluster by treating each key as a polynomial and dividing it by a polynomial of the form $1X^m+1$ where 1 is the unit element of an algebraic ring related to the characterization of the keys.

It is another object of this invention to provide a method of key to address transformation which utilizes a circuit having one algebraic ring addition device and a delay device.

It is another object of this invention to provide a method of key to address transformation which utilizes a circuit having one modulo-$j$ addition device, $j=2, 3, \ldots$, and a delay device.

The practice of this invention provides an advantage over the prior art in that keys of unrestricted length are transformed to respective addresses having a common length.

Another advantage provided by the practice of this invention is the transformation to different addresses of keys which differ in positions within a span of $m$ positions. Another advantage provided by the practice of this invention is the simplicity of the structure required therefor for key to address transformation.

While the invention has been particularly shown and described with reference to a preferred embodiment thereof, it will be understood by those skilled in the art that various changes in form and details may be made therein without departing from the spirit and scope of the invention.

Figure 1:
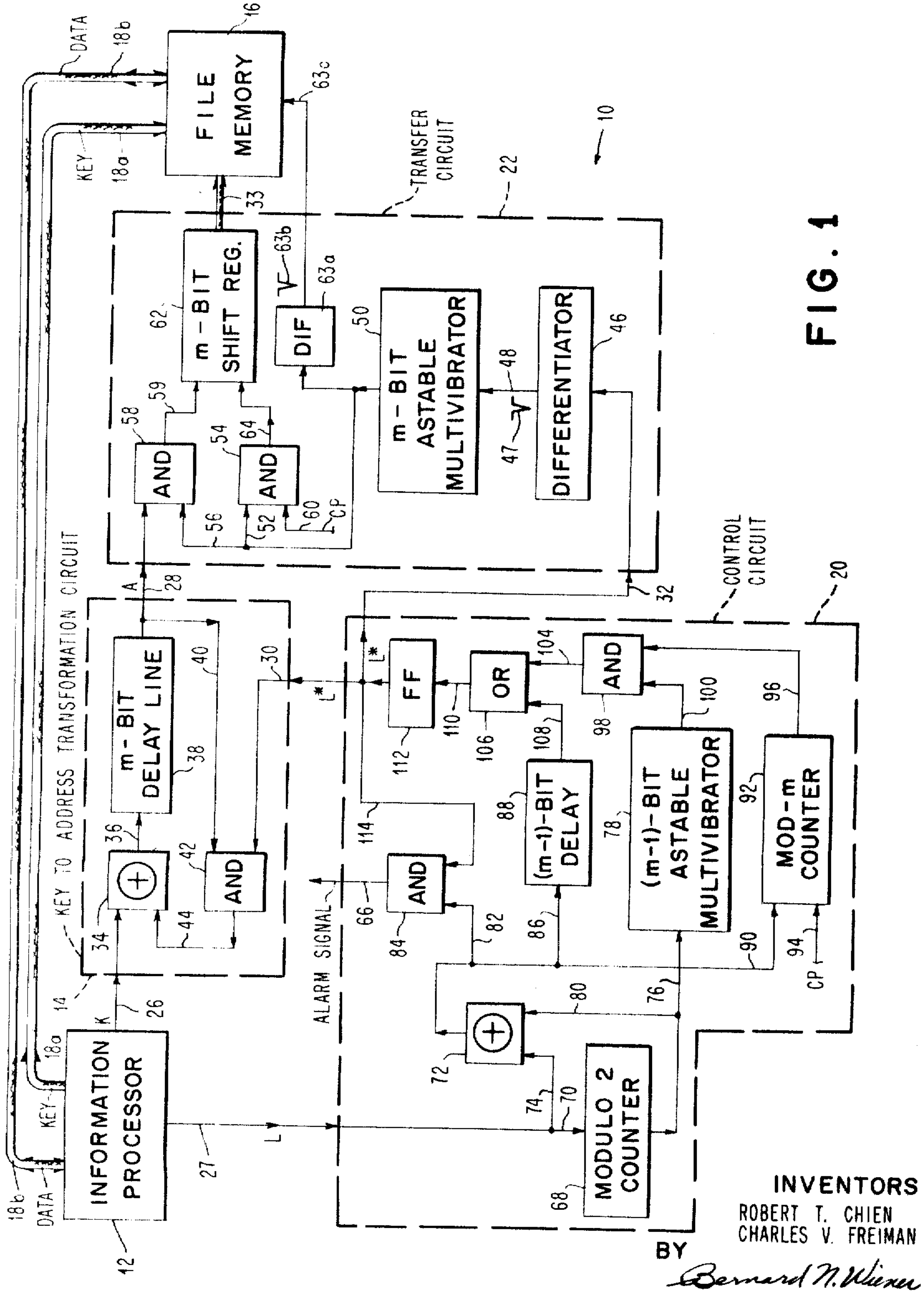
FIG. 1 is a schematic diagram of a preferred embodiment of this invention illustrating the use of a control circuit, a modulo-2 adder circuit and an $m$-bit delay line for the practice of key to address transformation.

Generally, the invention hereof provides apparatus which includes a processor of information which applies keys to a key to address transformation circuit. A control circuit operating in coordination with information related to the keys controls the operation of the key to address transformation circuit and causes the generation and transfer of addresses to a file memory. The key to address transformation circuit effects polynomial division of the key in the algebraic ring with unit as determined by the characterization of the keys. (The unit element of an algebraic ring is an element thereof which is its own multiplicative inverse.) The remainder of this division is the address associated with the key. Illustratively, the ring may consist of the integers modulo ten (0, 1, . . ., 9) under the operations arithmetic addition and multiplication performed modulo-10. For example, $4\times6=4$ as $24\equiv4$ (mod. 10). In further illustration, the ring may consist of the integers modulo-2 (0.1) under the arithmetic operations addition and multiplication performed modulo-2. For example, $1+1=0$, as $2\equiv0$ (mod. 2). Should the keys be initially composed of non-ring elements, and as letters of the alphabet, an algebraic ring with unit may easily be derived therefrom by assigning integers modulo the number of different symbols used for key representation. For example, the integers modulo-26 could be used if keys are composed of alphabetic characters only.

In particular, the invention hereof provides a file system in which keys characterized as binary sequences are transformed to addresses characterized as binary sequences in a manner that all keys in which different positions are spannable by a length of $m$-bits are transformed to different addresses.

One of the major problems encountered in the application of large document storage and memory systems is the conversion of the key by which each information item is uniquely identified to the address of the storage location assigned to the item. In many file systems, this conversion is carried out in two steps. The first step involves the transformation of the key to an intermediate address which serves as a starting point from which the actual address may be found. One problem for which this invention provides a solution is the need to have a key to address transformation circuit which operates on keys of variable length and which are presented to it asynchronously. The variable length mode of operation is important in two regards. First, where the keys are of variable length, a higher throughput in terms of the number of keys processed is obtained than would be obtained were all keys padded to some fixed length. Second, where the operation involves keys of fixed length for some appreciable period of time, it is possible to switch immediately to keys of another fixed length, without any change in the key to address transformation circuit itself.

In the practice of the invention all variable-length keys are transformed as if their length $n$ were an integer multiple of $m$, i.e., $n=jm$ ($j=1, 2, 3, \ldots$). This is accomplished by a procedure which may be considered to be equivalent to adding 0's, where 0 denotes the additive identity of an algebraic ring, in the low order end of the key during the key to address transformation. Specifically, $j=2, 3, \ldots$, for the preferred embodiment of the invention presented herein.

The asynchronous operation of the invention as to the presentation of the keys to the key to address transformation circuit is especially applicable where there is some variable process time, or where the method of generating keys does not itself insure that they are presented at some fixed rate.

THEORY OF INVENTION

Since the number of digits $n$ in a key is usually much larger than the number of digits $m$ in the address, a transformation which uniformly maps the keys to respective addresses normally transforms more than one key to the same address. If two keys are assigned to the same address, the time required to identify the file location for the associated information is increased. Therefore, it is important, in choosing among potential transformations, to utilize the available information concerning order in the key set to minimize the number of synonomous addresses obtained by the chosen transformation. In many key sets, keys tend to cluster in such a way that, not only are the number of positions in which a pair of clustered keys differ small, but also the positions in which they differ tend to bunch. For example, in a file using last names and initials for keys, the clusters around last names differ in the positions of the initials and the location of these differing positions varies from cluster to cluster. In order to distribute such clusters for keys of unlimited length, division by polynomials is used in the practice of this invention which is similar to division by generator polynomials in burst-error detecting codes. The text "Error-Correcting Codes" by W. W. Peterson, John Wiley & Sons, Inc. 1961 is a background reference for error-correcting codes.

In the prior art, the following patent applications have considered key to address transformation corresponding to certain other error-correcting codes: S.N. 272,707 for "File Memory System With Key to Address Transformation Apparatus" by S. Muroga; and S.N. 272,802 for "Method and Apparatus of Addressing a Memory" by M. Hanan et al. These patent applications are assigned to the assignee hereof.

Common to this invention and previous work is the use of polynominal division in the generation of addresses. But, previous work has required the polynominal coefficients to be elements of a Galois field and in no previous work is it shown how to guarantee the breaking-up of clusters of arbitrarily long fixed-length keys. Furthermore, none of the generator polynominals considered in previous work permits the breaking up of clusters in sets of variable-length keys nor does previous work teach how propertly chosen polynominals may be used for a variable-length mode of operation of a key to address transformation circuit.

The practice of this invention utilizes keys characterized as sequences of elements of an algebraic ring with unit. A reference for algebraic rings is "Modern Algebra," vol. I, chapter 3, by B. L. Van der Waerden, Frederick Ungar Pub. Co., 1953.

Defining properties of an algebraic ring with unit element are presented below and are illustrated by the ring of integers modulo-10. A given set of elements, $S=\{C_1, C_2, C_3, \ldots\}$, with two arbitrarily defined operations, + and ·, constitute a ring with unit provided the following conditions are satisfied. (In the example, the set of elements is {0, 1, 2, 3, 4, 5, 6, 7, 8, 9}, and the operations are arithmetic, addition and multiplication modulo-10 as shown in tables 1*a* and 1*b*.)

TABLE 1A.—ADDITION MODULO-10

| + | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 1 | 2 | 3 | 4 | 5 | 6 | 7 | 8 | 9 | 0 |
| 2 | 2 | 3 | 4 | 5 | 6 | 7 | 8 | 9 | 0 | 1 |
| 3 | 3 | 4 | 5 | 6 | 7 | 8 | 9 | 0 | 1 | 2 |
| 4 | 4 | 5 | 6 | 7 | 8 | 9 | 0 | 1 | 2 | 3 |
| 5 | 5 | 6 | 7 | 8 | 9 | 0 | 1 | 2 | 3 | 4 |
| 6 | 6 | 7 | 8 | 9 | 0 | 1 | 2 | 3 | 4 | 5 |
| 7 | 7 | 8 | 9 | 0 | 1 | 2 | 3 | 4 | 5 | 6 |
| 8 | 8 | 9 | 0 | 1 | 2 | 3 | 4 | 5 | 6 | 7 |
| 9 | 9 | 0 | 1 | 2 | 3 | 4 | 5 | 6 | 7 | 8 |

TABLE 1B.—MULTIPLICATION MODULO-10

| · | 0 | 1 | 2 | 3 | 4 | 5 | 6 | 7 | 8 | 9 |
|---|---|---|---|---|---|---|---|---|---|---|
| 0 | 0 | 0 | 0 | 0 | 0 | 0 | 0 | 0 | 0 | 0 |
| 1 | 0 | 1 | 2 | 3 | 4 | 5 | 6 | 7 | 8 | 9 |
| 2 | 0 | 2 | 4 | 6 | 8 | 0 | 2 | 4 | 6 | 8 |
| 3 | 0 | 3 | 6 | 9 | 2 | 5 | 8 | 1 | 4 | 7 |
| 4 | 0 | 4 | 8 | 2 | 6 | 0 | 4 | 8 | 2 | 6 |
| 5 | 0 | 5 | 0 | 5 | 0 | 5 | 0 | 5 | 0 | 5 |
| 6 | 0 | 6 | 2 | 8 | 4 | 0 | 6 | 2 | 8 | 4 |
| 7 | 0 | 7 | 4 | 1 | 8 | 5 | 2 | 9 | 6 | 3 |
| 8 | 0 | 8 | 6 | 4 | 2 | 0 | 8 | 6 | 4 | 2 |
| 9 | 0 | 9 | 8 | 7 | 6 | 5 | 4 | 3 | 2 | 1 |

*Defining properties of an algebraic ring with unit element*

(1) Closure: For any pair of elements $Ci$, $Cj$, $\epsilon S$; $Ci+Cj$, $\epsilon S$ and $Ci \cdot Cj \epsilon S$.

(2) Associativity: For $Ci$, $Cj$, $Ck \epsilon S$, $$Ci+(Cj+Ck)=(Ci+Cj)+Ck$$

and $$Ci \cdot (Cj \cdot Ck)=(Ci \cdot Cj) \cdot Ck$$

(3) Solvability of the equation $Ci+X=Cj$: For $Ci$, $Cj \epsilon S$, an element $X \epsilon S$ may be found such that $Ci+X=Cj$. (For example: If $Ci=9$ and $Cj=6$, then $X=7$ and we have $9+7=6$.)

(4) Distributive Laws: For $Ci$, $Cj$, $Ck \epsilon S$, $$Ci \cdot (Cj+Ck)=Ci \cdot Cj+Ci \cdot Ck$$

and $$(Cj+Ck) \cdot Ci=Cj \cdot Ci+Ck \cdot Ci$$

(For example: If $Ci=7$, $Cj=8$, $Ck=9$, $$7 \cdot (8+9) \stackrel{?}{=} 7 \cdot 8+7 \cdot 9$$
$$7 \cdot 7 \quad | \quad 6+3$$
$$9 \quad | \quad 9)$$

(5) Unit Element: An element $e \epsilon S$, exists such that for any $Ci \epsilon S$, $$Ci \cdot e=e \cdot Ci=Ci$$

(For example: The integer 1 has this property in the ring of integers modulo-10.)

The ring of integers modulo-10 is not an algebraic field as it is not always possible to solve the following equation for X:

$$CiX=Cj$$

Illustratively, for the case $Ci=2$, $Ci=3$ no X exists as $$2 \cdot 0=2 \cdot 5=0$$
$$2 \cdot 1=2 \cdot 6=2$$
$$2 \cdot 2=2 \cdot 7=4$$
$$2 \cdot 3=2 \cdot 8=6$$
$$2 \cdot 4=2 \cdot 9=8$$

In order to demonstrate that, independent of key length, two fixed-length keys whose different digits are within a span of $m$ positions will yield different remainders (addresses) when divided by any polynominal of the form $$M(X)=1 \cdot X^m+C_{m-1}X^{m-1}+ \ . \ . \ . \ +C_1X^1+1$$

where the $Cj$ ($j=2, \ldots, m-1$) are elements of an algebraic ring with unit element 1, the two different keys are represented by the polynominals $$G(X)=g_{n-1}X^{n-1}+g_{n-2}X^{n-2}+ \ . \ . \ . \ +g_o$$
$$H(X)=h_{n-1}X^{n-1}+h_{n-2}X^{n-2}+ \ . \ . \ . \ +h_o$$

Since the coefficient of $X^m$ is taken to be 1, the multiplicative identity within the ring, it is possible to find the remainders when G(X) and H(X) are divided by M(X). Terming these remainders $R_g(X)$ and $R_h(X)$, respectively, there are obtained $$G(X)=P_g(X) \cdot M(X)+R_g(X)$$
$$H(X)=P_h(X) \cdot M(X)+R_h(X)$$

where $P_g(X)$ and $P_h(X)$ represent the quotient polynominals of the division and the degree of $R_g(X)$ and of $R_h(X)$ is less than $m$. It then follows that if $R_g(X)=R_h(K)$, $$G(X)-H(X)=M(X)[P_g(X)-P_h(X)]$$

Since $G(X) \neq H(X)$, $P_g(X)-P_h(X) \neq 0$. Or, alternatively stated, the polynominal representing the difference of G(X) and H(X) must be some non-zero polynominal multiple of M(X). As the coefficients for the $X^m$th term and the $X^o$th term are both one, the non-zero positions of any non-zero polynominal multiplication of M(X) must span at least $(m+1)$ positions. Since $G(X)-H(X)$ will be non-zero in exactly those positions where the two keys differ, it follows that, when these differing positions are within a span of $m$ positions, $R_g(X)$ cannot equal $R_h(X)$.

Note that the degree of G(X) and H(X) has not been used above. Hence, this cluster-breaking property is independent of these key lengths. It is necessary, when clusters are identified in a key set, that corresponding digits always be treated as coefficients of the same power of X. Fixed-length keys may be formed from variable length keys by padding with 0's. Care must be taken to preserve the identity of clusters to be sure that they will be broken. For example:

9 JAN 54
10 JAN 54 should be padded as

09 JAN 54
10 JAN 54 and not as

9 JAN 540
10 JAN 54

When $X^m+1$ is used for binary keys, the implementation of the invention may use a single modulo-2 adder at the input of an $m$-bit delay line with feedback from the output of the delay line to adder. If keys are padded with 0's, the contents of the delay line only changes in phase relationship once the last non-zero digit of the key is introduced. Hence, for short keys the final result is available without complete padding. This will be true in general for other polynomials for the practice of this invention which have more than two non-zero coefficients, as the contents of the division circuit will no longer simply cyclically shift as 0's are introduced. Since the content of the polynomial division circuit does change in phase relationship when $X^m+1$ is used, a standard phase relationship must be introduced. This is accomplished in the preferred embodiment hereof through a modulo-$m$ requirement on the operational length of the keys. This is illustrated by the following binary example. The keys

| | |
|---|---|
| 110100 | Key I |
| 111 | Key II |

should correspond to different addresses for $m=2$ as they differ by but 2 positions when padded out to some length≧6. If neither key is padded, the following remainders are obtained after dividing each key polynomial by $X^2+1$ (note that modulo-2 addition and multiplication are used in the synthetic division shown below).

Key I

| | |
|---|---|
| Dividend | 110100 |
| Divisor | 101 |
| | 11100 |
| | 101 |
| | 1000 |
| | 101 |
| Remainder | 10 |

Key II

| | |
|---|---|
| Dividend | 111 |
| Divisor | 101 |
| Remainder | 10 |

It is observed that erroneous addresses are obtained if padding is not employed. Padding the key II to four positions accomplishes the same result as that which would be obtained by padding it to 6, 8, 10, . . . positions and hence suffices to establish the correct remainder; i.e.,

```
key II padded to
four positions
------------------
1110
101
------------------
 100
 101
 ----
  01
key II padded to
six positions
------------------
111000
101
------------------
 10000
 101
 -----
   100
   101
 -----
    01
```

DESCRIPTION OF EMBODIMENT

Figure 2:
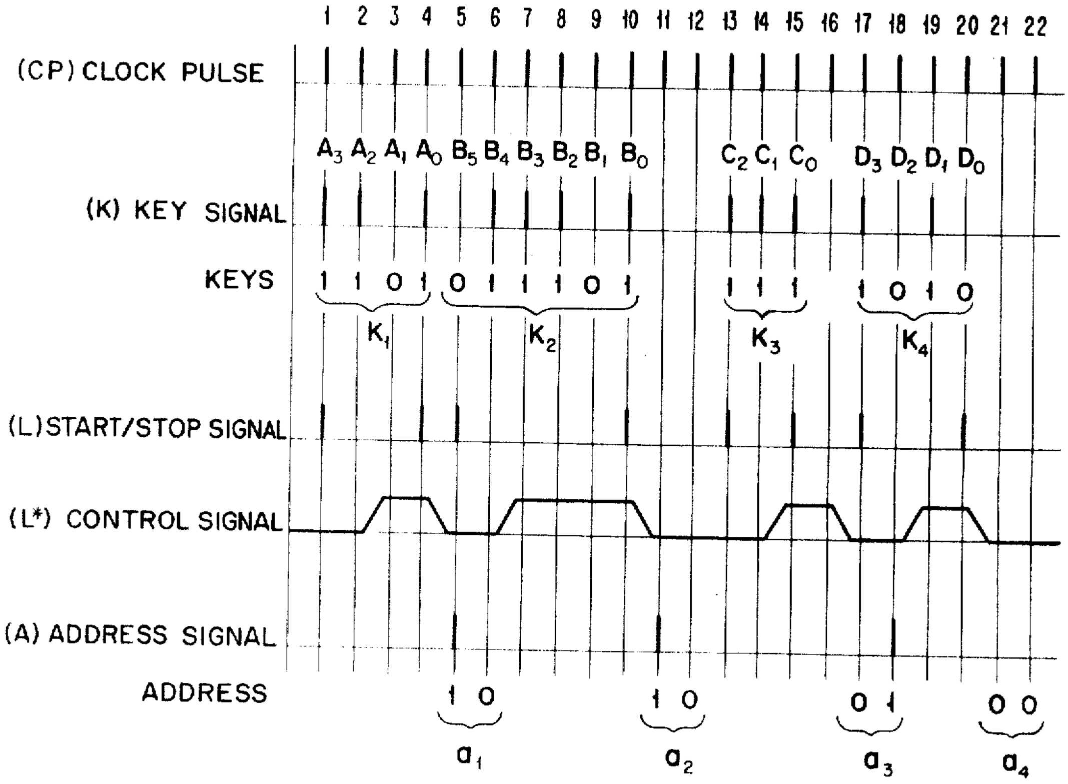
FIG. 2 is a timing diagram for the embodiment of FIG. 1 for the case of $m=2$.

The operation of the preferred embodiment of this invention will be described with reference to FIGS. 1 and 2. FIG. 1 is a schematic diagram of information processing system 10 and FIG. 2 is a timing diagram therefor. The information processing system 10 operates synchronously by bits. However, the keys may be presented asynchronously i.e., the "1" bits of a key sequence are represented by pulses which are constrained to occur only at clock-pulse times, but there is no requirement for regularity in the spacing of the keys one from another in time, nor is there any requirement that each key contain the same number of bits.

Generally, the information processing system 10 includes information processor 12 connected by line 26 to a key to address transformation circuit 14 which provides an address for each key applied thereto for file memory 16. The address is applied to transfer circuit 22 on line 28 and therefrom on cable 33 to file memory 16. Information processor 12 is of conventional design and in the embodiment shown might consist of a typical information processing device augmented by the circuitry required to generate a start/stop signal L delivered to control circuit 20 via line 27 for each key. Information processor 12 provides a start pulse L on line 27 as the high order bit of a key is applied to line 26 and a stop pulse L when the low order bit is applied. File memory 16 is of conventional design and stores each key and associated data as supplied by cables 18*a* and 18*b* at that unused location whose address is closest to, but not less than, the address *a* provided by key to address transformation circuit 14 via transfer circuit 22 and cable 33. When data is to be retrieved from file memory 16, a key is supplied by the information processor 12 via line 18*a* and address *a* as derived from this key by key to address transformation circuit 14, is supplied via transfer circuit 22 and line 33. File memory unit 16 starts at address *a* and tests the key(s) stored at $a$, $a+1$, $a+2$, . . ., until a match is found with the key supplied by information processor 12. The data associated with the stored key is then returned to information processor 12 via line 18*b*. In the embodiment shown, this data consists of a binary sequence.

The binary digit length of a key applied to key to address transformation circuit 14 from information processor 12 may be of arbitrary digit length provided only that the length is greater than $m$, the number of digits by which the file memory 16 is to be addressed. No maximum key length is specified as the file memory 16 has provision to use auxiliary memory for combinations of key and address which prove too long for one memory location. Information processor 12 presents key binary sequence K on line 26 and the start/stop sequence L therefor on line 27. For each key, two pulses appear on line 27, one coincident with the first digit of the key and one coincident with the last digit of the key. Each key from information processor 12 is applied to address transformation circuit 14 and is processed thereby under control of control circuit 20 to generate a corresponding address *a*. Control circuit 20 also causes transfer circuit 22 to apply the address *a* to file memory 16. When data is to be obtained from file memory 16, the associated key K is applied from information processor 12 to key to address transformation circuit 14 and the address *a* obtained therefrom is applied via transfer circuit 22 to file memory 16 which presents the appropriate data to cable 18*b*.

With reference to FIG. 2, a series of equally spaced clock pulses (CP) 1, 2, . . ., 22, generated by a clock pulse generator (not shown) represented by lines designated C. P., establish the basic timing for the information processing system 10. Although the last numbered clock pulse is indicated to be 22, it will be understood that there is a continuing series of equally spaced clock pulses throughout the duration of the operation of the information processing system 10. The timing provided by clock pulses sets the order of the information processing system 10 and permit operations therein to be regulated with respect to each other. Each key's binary sequence is applied to line 26 and the start/stop pulses associated therewith which identify the beginning and end of a key are applied to line 27.

The embodiment of FIG. 1 corresponds to the particular case of $m=2$, and the keys illustrated in the timing diagram of FIG. 2 are $K_1$ to $K_4$, which are the binary digit sequences 1101, 011101, 111, and 1010, respectively. The start/stop sequence L thus consists of a pulse at time 1 to identify the first digit of key $K_1$ being applied to key to address transformation circuit 14 and a pulse at time 4 to signify the last digit of key $K_1$. Pulses occur at time 5 and at time 10 to signify the first digit and last digit of key $K_2$ being applied to key to address transformation circuit 14. A pulse occurs at time 13 to signify the first digit of key $K_3$ being applied to key to address transformation circuit 14 and a pulse occurs at time 15 to signify the last digit being applied to key to address transformation circuit 14. A pulse occurs at time 17 and one occurs at time 20 to signify the first and last digit of key $K_4$ being applied to key to address transformation circuit 14. For illustrative purpose, the keys $K_1$ to $K_4$ are characterized as binary digit sequences $A_3\ A_2\ A_1\ A_0$, $B_5\ B_4\ B_3\ B_2\ B_1\ B_0$, $C_2\ C_1\ C_0$, and $D_3\ D_2\ D_1\ D_0$, respectively. The addresses A corresponding to keys $K_1$, $K_2$, $K_3$ and $K_4$ are $a_1=10$, $a_2=10$, $a_3=01$ and $a_4=00$, respectively, as illustrated in FIG. 2. The derived control signal L* is provided by control circuit 20 on line 30, 32 and 114. The derived control signal L* enables AND circuit 42 of key to address transformation circuit 14 and also generates the signal on line 32 which permits transfer circuit 22 to provide the address developed by key to address transformation circuit 14 to be applied via cable 33 to file memory 16. Derived control signal L* remains in the down condition after a key sequence K has been applied to key to address transformation circuit 14 for a period characterized by $m$ bits-times. This permits the first $m$ bits of the key to enter the key to address transformation circuit 14 and be established in delay line 38 thereof without being added modulo-2 to the previous contents of the $m$-bit delay line 38.

In greater detail, the timing diagram of FIG. 2 illustrates timing for the implementation of the polynomial $X^2+1$. The key signals K correspond to the keys 1101, 011101, a blank of two bit-times during which no key is present on the input line 26 to the key to address transformation circuit 14, key 111, a blank of one bit-time, and finally the key 1010. Due to the $m$-bit delay, accompanying derived control signal L* begins to rise at time 2, fall at time 4, rise at time 6, fall at time 10, rise at time 14, fall at time 16, rise at time 18, and fall at time 20. Note that the derived control signal L* begins to fall at time 16 rather than at time 15, the end of $K_3$, as the control circuit 20 insures that L* will always be up an integer multiple of two bit-times. Also note that L* remains in the down state until time 14 after beginning to fall at time 10. This is due to the two bit-time delay between $K_2$ and $K_3$. The address $a_1$ occurs at times 5 and 6 for key $K_1$. The address $a_2$ occurs at times 11 and 12 for key $K_2$. During times 11 and 12 a key is not being processed. The address $a_3$ occurs at times 17 and 18 for key $K_3$ and at times 21 and 22 for key $K_4$. Because of the padding procedure above described, the times 17 and 18 for the occurrence of the address $a_3$ are after the fall of derived control signal L* rather than immediately after the end of the key pulse at time 15 for the key $K_3$. The detailed nature and operation of control circuit 20 will be described hereinafter.

Modulo-2 adder unit 34 provides 0 as output if both inputs are 0 or 1. It provides 1 as output if either input is 1 and the other is 0. The key to address transformation circuit 14 includes a modulo-2 adder circuit 34 to which line 26 is connected as an input. The output from modulo-2 adder unit 34 is connected via line 36 to $m$-bit delay line 38. The output of $m$-bit delay line 38 is connected via line 40 to AND unit 42 whose output is connected via line 44 to the other input of modulo-2 adder circuit 34. The output from $m$-bit delay line 38 is also connected via line 28 to address transfer circuit 22.

Transfer circuit 22 includes a differentiator circuit 46 whose input is via line 32 from control circuit 20. The output of differentiator circuit 46 is connected via line 48 to the input of $m$-bit astable multivibrator 50 and shifts it to the unstable (1) state. It takes $m$ bit-times to shift from the unstable (1) state to stable (0) state. The output of $m$-bit astable multivibrator 50 enables AND circuit 54 via line 52 and AND circuit 58 via line 56. When enabled, AND circuit 54 transmits the clock pulses CP applied via line 60. AND circuit 58, when enabled by $m$-bit multivibrator 50 transfers the address present in $m$-bit delay line 38 to $m$-bit shift register 62. The $m$-bit shift register 62 is stepped by pulses from AND circuit 54 applied via line 64.

In the operation of key to address transformation circuit 14, the first $m$-bits of a key are established in $m$-bit delay line 38. Thereafter, as each succeeding bit of the key is applied to circuit 14, it is added in modulo-2 adder circuit 34 to the bit which is leaving the delay line 38 via line 40. The AND circuit 42 remains enabled by a derived control signal L* until all the bits of the key have been introduced via modulo-2 adder circuit 34 to $m$-bit delay line 38. Thus, the derived control signal L* remains in the up condition after the first $m$-bits of the key have been introduced to circuit 14 until both the pulse signifying the last bit of the key has been introduced and an integer multiple of 2 bit-times has elapsed since it began to rise. Thereafter, the control signal L* goes from the up condition to the down condition. Illustratively, for key $K_1$ the derived control signal L* remains in the down condition until bits $A_3$ and $A_2$ have been introduced to transformation circuit 14 the bits being entered in the order $A_3\ A_2\ A_1\ A_0$. Thereafter, it goes to the up condition and remains there until bits $A_1$ and $A_0$ have been introduced to circuit 14. Thus, in the operation of key to address transformation circuit 14, bit $A_3$ is added modulo-2 to bit $A_1$ and bit $A_2$ is added modulo-2 to bit $A_0$ to give the address $a_1=10$. The occurrence of an end of key pulse at clock pulse time 4 causes the derived control signal L* to go to the down condition.

Since the derived control signal L* goes from the up condition to the down condition, differentiator circuit 46 provides a negative pulse 47 shown adjacent to line 48 which is applied to switch $m$-bit astable multivibrator 50 to its unstable state. Thus, for $m$ bits of time, the AND circuits 54 and 58 are enabled permitting the address which is present in $m$-bit delay line 38 to be applied to transfer circuit 22 via line 28 and be passed by AND circuit 58 to $m$-bit shift register 62. As clock pulses CP are applied via line 60 to AND circuit 54, when it is enabled by $m$-bit astable multivibrator 50, they step $m$-bit shift register 62 appropriately to establish therein the $m$-bit address which was present in $m$-bit delay line 38. The address $a$ present in $m$-bit shift register 62 is applied therefrom via cable 33 to file memory 16 under control of file memory 16. File memory 16 uses the negative pulse 63b developed by differentiator circuit 63a and received via line 63c to determine when addresses are available.

The contents of the $m$ positions of $m$-bit shift register 62 is presented to file memory 16 in parallel via cable 33. The file memory 16 accepts the address signals in cable 33 sometime after the receipt of negative pulse 63b. When the next address is shifted into $m$-bit shift register 62, the content of the last shift register stage is not retained. Therefore, the preceding address is destroyed.

As key 0's are represented by the absence of a pulse, one effect of keeping L* up an integer multiple of $m$ bit-times is to change the operational key length to a multiple of $m$ by adding 0's at the end of the key. Thus, with reference to FIG. 2, $K_3$ is initially 111 but is processed in exactly the same manner as if it were the key $1110=C_3\ C_2\ C_1\ C_0$.

Control circuit 20 causes the operational length of a key to be an integer multiple of $m$. As will be described later, it may occur that information source 12 will supply keys too quickly for the successful operation of control circuit 20, in which event, the nature of control circuit 20 is such that an alarm signal is presented to line 66. If the alarm signal is present on line 66 it is used according to the operational requirements of information processing system 10. Generally, the key being transformed to an address and the new keys should be re-introduced properly when there is an alarm signal. The operation of the information processing system 10 will be discussed herein under the assumption that no alarm signal does ring, i.e., the next key is not introduced from information processor 12 to line 26 until the preceding key has been appropriately extended by padding it out with 0's. The information processor 12 does not introduce the next key until the previous key has been introduced and an interval which is an integral multiple of $m$ has elapsed from the start of the previous key.

The first $m$ bits of a key pass through modulo-2 adder unit 34 to delay line 38 via line 36. Since the derived control signal L* at this time is in the down state, the previous contents of $m$-bit delay line 38 are not applied via AND circuit 42 to modulo-2 adder circuit 34. After the $m$ position bit has been introduced to key to address transformation circuit 14, the derived control signal L* goes to the up condition thereby enabling AND circuit 42 and permitting the first bit of the key which was established in $m$-bit delay line 38 to be added modulo-2 to the $m+1$ bit then being applied to modulo-2 adder circuit 34. The operation of key to address transformation circuit 14 continues until the fall of the derived control signal L*. If the key is not initially in the form of a binary sequence which is an integer multiple of $m$, the derived control signal L* does not coincide with the end-of-key pulse but is extended to permit 0's to be sequentially applied to modulo-2 adder circuit 34 to obtain an integer multiple of $m$. During the interval between keys 0's are applied at each clock pulse CP to modulo-2 adder circuit 34 on line 26. Since a binary 0 added to either a binary 1 or a binary 0 on line 44 does not effect the output of modulo-2 adder circuit 34, the correct address will ultimately be established in $m$-bit delay line 38.

After the desired $m$-bit address has been established in $m$-bit delay line 38, derived control signal L* goes from the up condition to the down condition. In this process, differentiator unit 46 provides an output pulse on line 48 which triggers $m$-bit astable multivibrator 50 to its unstable state. Since $m$-bit astable multivibrator 50 takes $m$ bits of time to pass from the unstable state to the stable one, the $m$ bits of the address $a$ in delay line 38 will be passed via AND circuit 58 to $m$-bit shift register 62. Since clock pulses are being applied continuously to AND circuit 54 via line 60, *m*-bit shift register 62 will be appropriately stepped to permit the address to be established therein.

The nature and operation of control circuit 20 will now be described. Control circuit 20 has input line 27 and output lines 30, 32 and 66 and is also fed from the clock pulse generator, not separately shown, via line 94. Generally, the clock pulse generator is a part of information processor 12. Input line 27 is connected to modulo-2 counter circuit 68 via line 70 and to an input of modulo-2 adder circuit 72 via line 74. Modulo-2 counter circuit 68 is connected via line 76 to $(m-1)$ bit astable multivibrator 78 and via line 80 to the other input of modulo-2 adder circuit 72. The output of modulo-2 adder circuit 72 is connected via line 82 to an input of AND circuit 84, via line 86 to the input of $m-1$ bit delay 88, and via line 90 to the input of modulo-*m* counter 92. Clock pulses CP are applied to modulo-*m* counter 92 via line 94. The output of modulo-*m* counter 92 is applied via line 96 to AND unit 98. The output of the $(m-1)$-bit astable multivibrator 78 is applied via line 100 to enable AND circuit 98 and therefrom via line 104 to an input of OR gate 106. The output of $(m-1)$-bit delay 88 is passed via line 108 to the other input of OR gate 106. The output of OR gate 106 is presented on line 110 to an input of flip-flop 112 whose output enables AND unit 84 via line 114 and is applied to lines 30 and 32 as derived control signals L*. Flip-flop 112 changes state with each input pulse applied thereto on line 110.

In operation, control circuit 20 utilizes the stop and start L pulses, i.e., those which occur at the beginning of a key and those which occur at the end of a key, to control the transformation and transfer circuits 14 and 22, respectively. Modulo-2 counter 68 applies a (1) when it receives an end of key pulse on lines 76 and 80. A stop pulse will cause nearly simultaneous pulses on lines 74 and 80 and hence, will cause a (0) output from modulo-2 adder 72. This will not condition AND circuit 84. There is an output, however, from modulo-2 adder circuit 72 for start-of-key pulses. Therefore, the start-of-key pulses are applied to AND circuit 84 via line 82, to $(m-1)$-bit delay line 88 and to modulo-*m* counter 92. The $(m\text{-}1)$-bit delay 88 provides a pulse on line 108 to OR gate 106 at bit time *m* of a key. The counting of time positions begins with the first bit of a key. The output of OR circuit 106 is applied to flip-flop 112, which is originally in the (0) state and it is transferred to the (1) state between the time *m* and the time $m+1$ of a key. The flip-flop 112 is reset by the next end-of-key pulse through the operation of circuits 78 and 92. AND circuit 84 provides an output alarm signal on line 66 only when a pulse from modulo-2 adder circuit 72 appears on line 82 and flip-flop 112 is in the 1 state. Since flip-flop 112 should be in the 0 state before a new key may be processed, an output of AND circuit 84 indicates that there is difficulty in the processing of the keys and accordingly an alarm signal is established on line 66. As noted above, its use will depend upon the particular operating procedure for the information processing system 10.

An end-of-key pulse initiates the operation of $(m-1)$-bit astable multivibrator 78 whose duration between transfer of states is $(m-1)$ bit times. The modulo-*m* counter 92 provides a signal for each integer multiple of *m*. The counter 92 is run continuously by the CP pulses on line 94 and is reset by each start of key pulse on line 90 via modulo-2 adder 72. Since the $(m-1)$-bit astable multivibrator 78 is started operating by an end of key pulse, the AND circuit 98 provides a signal on line 104 when first both an integer multiple of *m* bits are encountered as indicated by an output from counter 92 and an end of key pulse has been detected via circuit 78. As circuit 78 is in the (1) state for $m-1$ clock pulse times, after an end of key pulse is established on line 27, AND circuit 98 is enabled only at an integral multiple of *m* clock pulse times.

When a key to address transformation circuit operates with fixed-length key sets only it is possible to remove the integer multiple of *m* restrictions on the function of the control circuit 20 of FIG. 1. The variation of key length from key set to key set would be indicated by start/stop pulses as at present, but the fall of the derived control signal L* would now always coincide with the end of key pulse. The output line 76 would be connected to OR circuit 106 in place of line 104.

An amplifying circuit may be necessary in some circumstances to maintain adequate signal levels in the key to address transformation circuit 14. The amplifying circuit may readily be included as part of AND circuit 42.

Conventional control operations for the information processor 12 and file memory 16 have not been described. Illustratively, file memory 16 should communicate with information processor 12 when an empty file memory location has been addressed. Further, during the time that file memory 16 is searching for an empty location, information processor 12 should not attempt to store another key and associated data in the file memory 16.

The preferred embodiment of this invention has been illustrated and described for data in electrical form. Other embodiments of this invention utilize data in the form of a photograph or other hard copy. For such embodiments, the information processor merely introduces the keys to the key to address transformation circuit 14. The file memory in such embodiments produces a copy of the data sought.

While the invention has been particularly shown and described with reference to a preferred embodiment thereof, it will be understood by those skilled in the art that various changes in form and details may be made therein without departing from the spirit and scope of the invention.

What is claimed is:

1. An information processing system comprising:

an information processor to provide variable length keys, data associated with said keys, and control pulses identifying the beginning and end of said keys;

a key-to-address transformation circuit connected to said information processor to receive said keys and to transform them to respective common length addresses, said transformation circuit having an algebraic-ring-with-unit addition means receptive of said keys, said addition means being characterized in accordance with said keys, a delay means connected to said addition means for delaying in time positions therefrom, and feedback means connected between the output of said delay means and the input of said addition means;

file memory means connected to said information processor and said key-to-address transformation circuit for storing said keys and said data;

transfer circuit means connected between said key-to-address transformation circuit and said file memory means to transfer said addresses therebetween; and control means responsive to said control pulses to regulate the operation of said key-to-address transformation circuit and to control the transfer therefrom via said transfer circuit means of said addresses to said file memory means.

2. The information processing system of claim 1 in which said keys are provided by said information processor asynchronously.

3. The information processing system of claim 1 in which said keys are sequences of elements of an algebraic ring with unit element.

4. The information processing system of claim 1 in which said keys are sequences of elements of an algebraic ring with unit element and are provided by said information processor asynchronously.

5. The information processing system of claim 1 in which said keys are sequences of elements of an algebraic ring with unit element, said keys in an *m*-span cluster being transformed to different addresses.

6. The information processing system of claim 1 in which the length of each said key is modified in said transformation circuit by said control means to the least multiple of *m* not smaller than the original key length, said *m* being the number of digits by which said file memory is addressed.

7. The information processing system of claim 1 in which each said key is a sequence of elements of an algebraic ring with unit element, said ring being the ring of integers modulo-*k* ($k=2, 3, \ldots$).

8. The information processing system of claim 1 in which said keys are sequences of elements of an algebraic ring with unit element and are provided by said information processor asynchronously, said ring being the ring of integers modulo-*k* ($k=2, 3, \ldots$).

9. The information processing system of claim 1 in which said keys are sequences of elements of an algebraic ring with unit element, said ring being the ring of integers modulo-*k* ($k=2, 3, \ldots$), said keys in an *m*-span cluster being transformed to different addresses.

10. An information processing system comprising:

an information processor, said information processor providing variable length keys, data associated with said keys, and control pulses identifying the beginning and end of said keys;

key-to-address transformation circuit connected to said information processor to transform said keys to respective addresses by polynominal division, said addresses being of digit length *m* and said keys being of at least digit length $m+1$, said digits being the integers modulo-*k* ($k=2, 3, \ldots$), said transformation circuit having an algebraic-ring-with-unit addition means receptive of said keys, said addition means being characterized in accordance with said keys, a delay means connected to said addition means for delaying in time positions from said addition means, and feedback means connected between the output of said delay means and the input of said addition means;

file memory means connected to said information processor and said key-to-address transformation circuit for storing said keys and said data at locations therein;

transfer circuit means connected between said key-to-address transformation circuit and said file memory means to transfer said addresses therebetween commencing when the last operational digit of said key has been introduced to said key-to-address transformation circuit; and control means responsive to said control pulses to regulate the operation of said key-to-address transformation circuit by controlling said polynomial division, said keys in an *m*-span cluster being transformed to different addresses, and to control the transfer therefrom via said transfer circuit means of said addresses to said file memory means, said control means generating a two-level control signal, said control signal transferring from high level to low level at the operational end of a key and remaining in the low level until after the *m*-th digit of the succeeding key has been introduced to said key to address transformation circuit.

11. In an information processing system wherein data is stored in and retrieved from a file memory in accordance with a key, and wherein keys of variable length are being applied;

a key-to-address transformation circuit having an algebraic-ring-with-unit addition means receptive of said keys, said means being characterized in accordance with said keys;

a delay means connected to said ring addition means for delaying in time the positions from said ring addition means, feedback means connected between the output of said delay means and said ring addition means;

whereby the respective addresses for said keys appear in said delay means, said keys in an *m*-span cluster being transformed to different addresses.

12. In an information processing system wherein data is stored in and retrieved from a file memory in accordance with a key, said key being a sequence of elements, a key to address transformation circuit having an algebraic-ring-with-unit addition means receptive of said keys, said means being characterized in accordance with the representation of said keys, said keys being of variable length;

means to delay the output of said addition means and interact it with the input thereof;

whereby there is obtained a respective address for each said key, said keys in an *m*-span cluster being transformed to different addresses.

13. An information storage system for operating upon variable length keys and providing common length addresses comprising, key to address transformation means operative to receive variable length keys and to generate common length addresses, said transformation means having an algebraic-ring-with-unit addition means receptive of said keys, said addition means being characterized in accordance with the representation of said keys, means to delay the output of said addition means and to interact it with the input thereof, means for applying said variable length keys to said transformation means, memory means having address locations corresponding to said generated addresses, and means for applying said generated addresses to said memory.

14. The information storage system of claim 13 in which said keys are provided by said means for applying said variable length keys asynchronously.

15. The information storage system of claim 13 in which said keys are sequences of elements of an algebraic ring with unit element.

16. The information storage system of claim 13 in which said keys are sequences of elements of an algebraic ring with unit element and are provided by said means for applying said variable length keys asynchronously.

17. The information storage system of claim 13 in which said keys are sequences of elements of an algebraic ring with unit element, said keys in an *m*-span cluster being transformed to different addresses.

18. The information storage system of claim 13 in which the length of each said key is modified in said transformation means to the least multiple of *m* not smaller than the original key length, said *m* being the number of digits by which said memory means is addressed.

19. The information storage system of claim 13 in which each said key is a sequence of elements of an algebraic ring with unit element, said ring being the ring of integers modulo-*k* ($k=2, 3, \ldots$).

20. The information storage system of claim 13 in which said keys are sequences of elements of an algebraic ring with unit element and are provided by said means for applying said variable length keys asynchronously, said ring being the ring of integers modulo-*k* ($k=2, 3, \ldots$).

21. The information storage system of claim 13 in which said keys are sequences of elements of an algebraic ring with unit element, said ring being the ring of integers modulo-*k*, ($k=2, 3, \ldots$) said keys in an *m*-span cluster being transformed to different addresses.

22. Apparatus for operating upon variable length keys to provide common length addresses comprising, key to address transformation means operative to receive variable length keys and to generate common length addresses, said transformation means having an algebraic-ring-with-unit addition means receptive of said keys, said addition means being characterized in accordance with the representation of said keys, and means to delay the output of said addition means and to interact it with the input to said addition means and means for applying said variable length keys to said transformation means.

23. The apparatus of claim 22 in which said keys are provided by said means for applying said variable length keys.

24. The apparatus of claim 22 in which said keys are sequences of elements of an algebraic ring with unit element.

25. The apparatus of claim 22 in which said keys are sequences of elements of an algebraic ring with unit and are provided by said means for applying said variable length keys asynchronously.

26. The apparatus of claim 22 in which each said key is a sequence of elements of an algebraic ring with unit element, said ring being the ring of integers modulo-$k$ ($k=2, 3, \ldots$).

27. The apparatus of claim 22 in which said keys are sequences of elements of an algebraic ring with unit and are provided by said means for applying said variable length keys asynchronously, said ring being the ring of integers modulo-$k$ ($k=2, 3, \ldots$).

28. Key to address transformation apparatus comprising:

modulo-$k$ ($k=2, 3, \ldots$) addition input means adapted to receive variable length keys;

digit delay means connected to said addition means to delay the output of said addition means $m$ digit times;

feedback means connected between the output of said delay means and said addition means;

said apparatus effecting the division operation of each said key characterized as a polynomial by a polynomial of the form $X^m+1$, whereby respective addresses of length $m$ are obtained in said delay means for said keys, said keys in an $m$-span cluster being transformed to different addresses.

29. Key to address transformation apparatus comprising:

an algebraic-ring-with-unit addition means adapted to receive said keys, said keys being of variable length;

a delay means connected to said ring addition means to receive the output thereof, and feedback means connected between the output of said delay means and said algebraic ring addition means;

whereby respective addresses for said keys are obtained in said delay means, said keys in an $m$-span cluster being transformed to different addresses.

References Cited by the Examiner

UNITED STATES PATENTS

| | | | |
|---|---|---|---|
| 3,054,987 | 9/1962 | Lawrence et al. | 340—172.5 |
| 3,093,814 | 6/1963 | Wagner et al. | 340—172.5 |
| 3,185,823 | 5/1965 | Ellersick et al. | 235—154 |
| 3,242,470 | 3/1966 | Hagelbarger et al. | 340—172.5 |

ROBERT C. BAILEY, *Primary Examiner.*

I. S. KAVRUKOV, *Assistant Examiner.*